Oct. 31, 1939.　　　N. M. LOWER　　　2,178,144
AUTOMOBILE BRAKE
Filed March 30, 1936　　　3 Sheets-Sheet 1
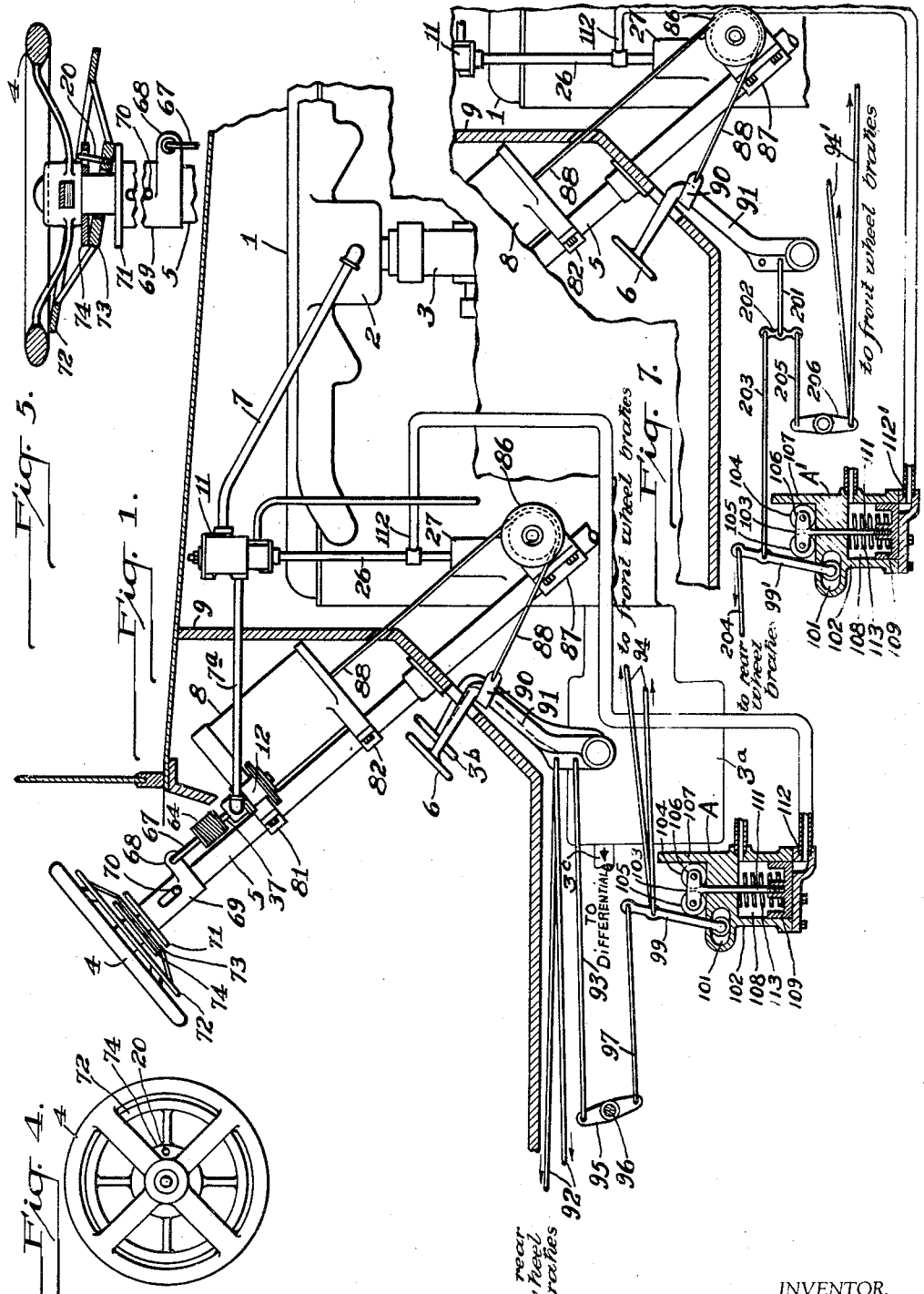
WITNESSES
A B Wallace
E. O. Johns
INVENTOR.
Nathan M. Lower
BY Brown, Critchlow & Flick
his ATTORNEYS.

Oct. 31, 1939.　　　N. M. LOWER　　　2,178,144
AUTOMOBILE BRAKE
Filed March 30, 1936　　3 Sheets-Sheet 2
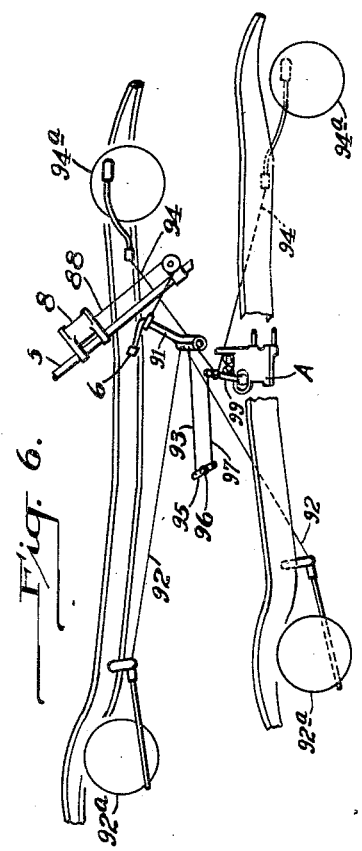
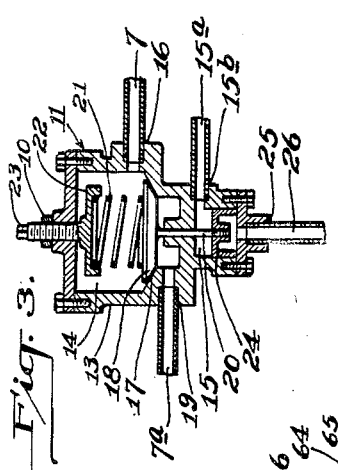
WITNESSES
O. B. Wallace.
E. O. Johns
INVENTOR.
Nathan M. Lower
By Brown, Critchlow & Flick
his ATTORNEYS.

Oct. 31, 1939.     N. M. LOWER     2,178,144
AUTOMOBILE BRAKE
Filed March 30, 1936     3 Sheets-Sheet 3

INVENTOR.
Nathan M. Lower
BY Brown, Critchlow & Flick
his ATTORNEYS

WITNESSES
A B Wallace
E. O. Johns

Patented Oct. 31, 1939

2,178,144

UNITED STATES PATENT OFFICE 2,178,144

AUTOMOBILE BRAKE

Nathan M. Lower, Tuckahoe, N. Y.

Application March 30, 1936, Serial No. 71,555

15 Claims. (Cl. 188—152)

This invention, which is a continuation-in-part of the invention disclosed in the present inventor's prior United States patent application Serial No. 265,479, filed March 28, 1928, now Patent No. 2,039,095, dated April 28, 1936, relates to brake systems and more particularly to a brake system devised for use on motor-driven vehicles.

Among its objects it is the purpose of the invention to provide a brake system for automobiles and the like in which the braking effort is automatically reduced as the speed of the automobile is reduced and the proportion of the braking action exerted by the brakes on the front and rear wheels automatically varied at different speeds and as the speed varies during the braking period, as long as the engine clutch is not disengaged and the car is connected in high gear.

Figure 9:
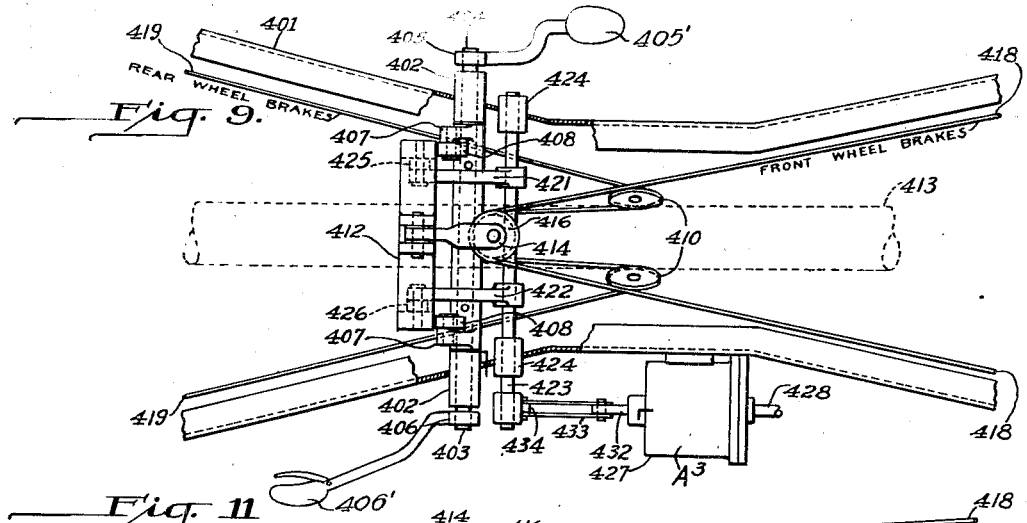
Figure 11:
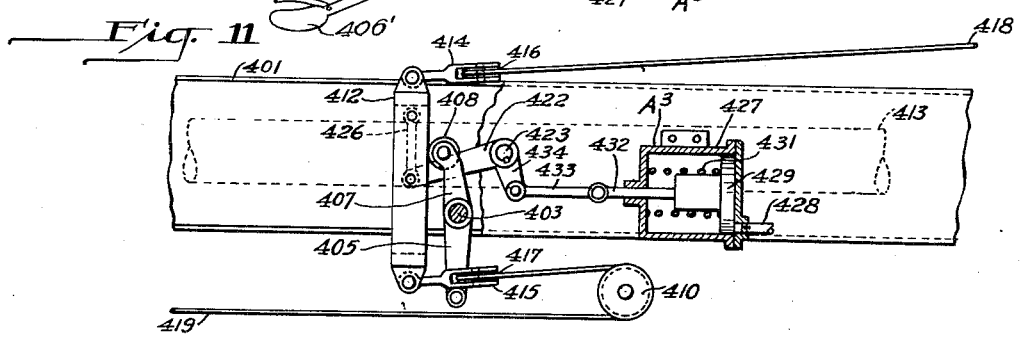
Figure 10:
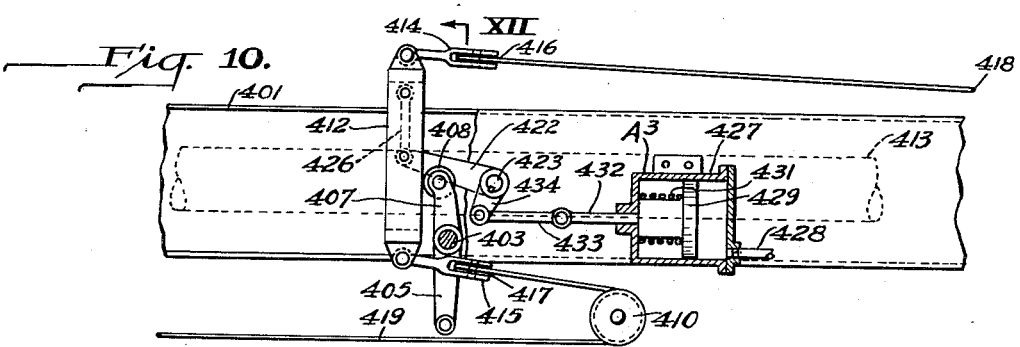
Figure 12:
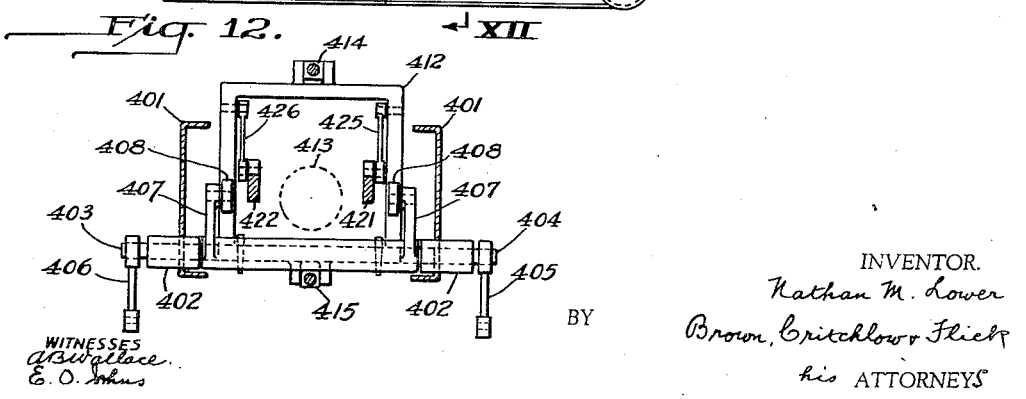

Other objects of the invention will become apparent when the following description is read in conjunction with the accompanying drawings wherein Fig. 1 illustrates a fragmentary elevational view of a motor vehicle equipped with a preferred embodiment of the invention; Fig. 2 a sectional view taken vertically through the center of the manually operated pneumatic pressure control valve and the pneumatic pressure-operable brake-actuating mechanism; Fig. 3 a sectional view taken through the center of the automatically operable pneumatic pressure valve; Figs. 4 and 5 respectively a top plan view and a cross-sectional view of the steering wheel and brake wheel; Fig. 6 a schematic plan view of the automobile chassis and brake system; Fig. 7 a view similar to Fig. 1 but showing the compensating device arranged on the rear wheel brake rods instead of the front; Fig. 8 a schematic view of a hydraulic braking system employing the invention; Fig. 9 a schematic view partly in plan and partly in section of another modified form of the invention; Figs. 10 and 11 similar side elevations of the structure illustrated in Fig. 9; and Fig. 12 a transverse view taken on the line XII—XII of Fig. 10.

Referring now to Fig. 1 of the drawings, there is illustrated a motor-driven vehicle provided with the usual internal combustion motor 1 which is equipped with an intake manifold 2 leading from the carbureter 3 to the cylinders of the motor, all in a well known fashion. The motor 1 is adapted to propel the vehicle through means of the customary gearing and clutching mechanisms indicated generally at 3a and including clutch pedal 3b and drive shaft 3c. The vehicle is also equipped with the customary steering wheel 4, steering post 5, and brake pedal 6. Connected to the intake manifold 2 at a point between the carbureter 3 and the engine cylinder is a conduit 7 utilized for establishing communication between the intake manifold and the vacuum-actuated cylinder or vacuum device 8 which may be mounted in various operative positions, but which, in this embodiment, is preferably mounted upon the steering post 5 just forward of the dashboard 9.

In order to control and regulate the vacuum created in the pneumatic pressure-operable device 8, an automatically operated valve mechanism 11 and a manually operable valve mechanism 12 are interposed in the conduit 7 between the intake manifold and the pressure-operable device 8.

The automatically operable valve mechanism 11, Fig. 3, comprises an outer casing 13 provided with an upper vacuum chamber 14 and a lower cylinder 15. Port 16 is provided in the casing 13 for inserting the conduit 7 to establish communication between the intake manifold 2 and the vacuum chamber 14. In the bottom of the vacuum chamber 14 is a port 17 controlled by a valve 18. Below the valve 18 and in the casing 13 is a port 19 in which is inserted a section 7a of the conduit 7 that leads to the manually operable valve mechanism 12. The valve 18 is provided for controlling the passage through the casing 13 and is resiliently biased towards its closed position by means of a helical spring 21, one end of which rests upon the top of the valve 18, the other end being fitted in an inverted cup member 22 carried by a threaded set-screw 23 disposed in the top of the valve casing 13. The purpose of the screw is to vary the compression of the spring 21 to predetermine the effort necessary to open the valve 18, and to prevent its turning when once adjusted it is locked in place by the lock-nut 10.

Slidably fitted in the cylinder 15, and connected by means of a stem 20 to the valve 18, is a piston 24. The piston 24 is provided to aid the force created by the suction in the intake manifold in the opening of valve 18. To actuate the piston 24 fluid pressure is introduced through the port 25 in the bottom of the cylinder 15.

In order to provide fluid pressure for actuating the piston 24 that will assist the force created by the vacuum in the intake manifold in holding the valve 18 open when the vehicle and motor are traveling at high speeds, and which will allow it to close gradually when the motor slows down with the stopping of the machine, the oil pressure created by the oil pump 21 (Fig. 1) of the motor is introduced into the base of the cylinder 15 by means of a conduit 26 which leads from the oil pump 27 to the cylinder 15. Accordingly when the motor is running at high speeds the oil pressure will cause the piston 24 to be forced upwardly to help open the valve 18. When the vehicle is being braked and the motor slows down, resulting in the oil pressure decreasing, the piston 24 and valve 18 are forced down by the spring 21, thereby obstructing the opening 17 in the casing 13. The spring 21 may be readily adjusted by means of the set-screw 23 so that when the motor has decelerated to a predetermined speed the oil pressure will not substantially affect the valve mechanism 11, and the opening therethrough will be dependent upon the suction force of vacuum created in the intake manifold 2. To permit any oil which may get past piston 24 into the upper part of cylinder 15 to return to the engine so it will not interfere with the operation of the piston, a return line pipe 15a is connected between a port 15b located adjacent the top of cylinder 15 and engine 1. The purpose, operation and function of this valve will be more clearly set forth hereinafter.

In order to facilitate assembly of the manually operable valve mechanism 12, the intermediate section 31 may be cast integrally with the cylinder 28 which encases the bellows 29, and the upper section 32 and the lower section 33 may be secured thereto by means of the bolts as illustrated in Fig. 2. The upper section 32 comprises a vacuum chamber 34 provided with port 35 for receiving the conduit section 7a of the vacuum line, an opening in the top for receiving a valve stem 37, and a tapered port 38 in the bottom adapted to seat a valve 39. The valve 39 is loosely mounted on the valve stem 37 and is shaped to close the port 38 when the valve is forced upwardly. Directly beneath the chamber 34 and in the middle section 31 is a chamber 41 provided with a duct 42 leading to and establishing communication with the pressure device 8. The port 38 and the valve 39 are positioned at the top of the chamber 41, and a similar port 44 and a cooperating valve 45 loosely mounted on the valve stem 37 are positioned at the bottom of the chamber. A coil spring 46 is positioned between and constantly bears on valves 39 and 45, urging them toward their respective seats 38 and 44. The port 44 establishes communication with a chamber 47 located just below the port, and to maintain atmospheric pressure within this chamber a port 48 is provided which is open to the surrounding atmosphere.

In the bottom of the chamber 47 is a central opening through which the valve stem 37 projects. Below the chamber 47 is another chamber 52 which is divided into two compartments 53 and 54 by means of a flexible diaphragm 55 disposed between section 31 and the section 33 of the valve casing. The upper compartment 53 is placed in communication with the vacuum device 8 by means of a duct 56 which connects it to the duct 42. The screw 49 is provided for regulating the opening between the ducts 56 and 42.

The diaphragm 55 has a bearing disc 57 provided in the center for receiving the end of the valve stem 37 and in order to counterbalance the weight of the valve stem and maintain the diaphragm 55 and valve stem 37 in normal position, a coil spring 58 is inserted below the disc 57, a depression 59 being formed in the lower section 33 of the casing for its reception.

In order that the diaphragm 55 may be actuated in response to the vacuum created in the compartment 53, atmospheric pressure is maintained in the lower compartment 54 by a small port 61 provided in the casing 33 directly below the spring 58. For opening the valve 39 a shoulder 62 is provided on the valve stem 37 just above the valve 39. This shoulder is adapted to impinge upon the valve 39 when the valve stem 37 is actuated in a downward direction. Similarly, for opening the valve 45 a shoulder 63 is provided on the valve stem 37 just below the valve 45 and is adapted to impinge upon the valve 45 when the stem moves upwardly.

In this valve mechanism 12 it will be seen that the suction created in the chamber 34 by the vacuum in the intake manifold will tend to close the valve 39, and in order to open the valve 39 to create a vacuum in the pneumatic pressure device 8 the valve must be forced downwardly by applying a force at the top of the valve stem 37. In order to open the valve 39 the stem 37 must be pressed downward with a force sufficient to overcome the resistance of the spring 46, the spring 58, the diaphragm 55 and the suction on the valve 39. In order to maintain the valve 39 open after a vacuum has been created in the vacuum device, the downward force applied to the stem 37 must be sufficient to overcome the tendency of the diaphragm 55 to press the valve stem 37 upwardly. The duct 56 establishes communication regulated by the screw 49 between the vacuum device 8 and the vacuum compartment 53, and the port 61 establishes atmospheric pressure in the lower compartment 54; consequently as pressure in the compartment 53 is reduced, atmospheric pressure in the lower compartment exerts a force in the upward direction upon the diaphragm 55 and the valve stem 37. Hence, a definite pressure may be maintained in the pressure device 8 if a constant force is applied to the valve stem 37 which will overcome a predetermined amount of back pressure on the diaphragm 55.

Various means may be provided for actuating the valve mechanism 12. A preferred means is illustrated here which comprises a helical spring 64 that is secured to the disc 65 threaded on the valve stem 37, and to a similar disc 66 that forms the lower end of a connecting rod 67. The connecting rod 67 in turn is attached to a projection 68 (Figs. 1 and 5) that forms a part of a sleeve 69 which is loosely mounted upon the steering post 5 and prevented from turning thereabout by a trunnion 70. The upper end of the sleeve member 69 terminates in a shoulder portion 71 that functions as a support for a brake-actuating wheel 72 loosely mounted on the steering post 5. The sleeve 69 is so disposed on the post 5 that its shoulder 71 normally holds the hub 73 of the brake-actuating wheel 72 in engagement with a shoulder or disk 74 affixed to the steering wheel 4. The brake-actuating wheel 72 is thus maintained adjacent to and immediately below the steering wheel 4, and the distance between the two wheels is made such that the operator of the vehicle can either push down on one side of the rim of the brake-actuating wheel with his thumb or pull up on it on the other side with his fingers to force the sleeve 69 downwardly, as illustrated in Fig. 5, without removing his hands from the steering wheel. The pin 20 is employed to insure movement of the brake wheel 72 with the steering wheel 4. A downward force exerted on the sleeve 69 is transmitted to the spring 64 by means of the connecting rod 67, which in turn biases the valve stem 37 to open the valve 39. By displacing the sleeve 69 far enough sufficient pressure may be impressed upon the spring 64 to force the valve stem 37 to unseat the valve 39. When it is desired to create an operative amount of vacuum in the vacuum device 8, the brake-actuating wheel 72 must be displaced sufficiently to apply a force that will overcome the resistance of the spring 46, the spring 58, the diaphragm 55, and the back pressure on the diaphragm 55 hereinbefore described.

When the air in the pneumatic device 8 and the vacuum compartment 53 has been exhausted sufficiently, the diaphragm 55 will be forced upward by atmospheric pressure, which exerts an upward force on the lower end of the valve stem 37, overcoming the downward pressure in the spring 64, and allowing the valve 39 to seat. As air leaks into the bellows 29 of vacuum device 8 reducing the pull on the cable 88, if the spring 64 is maintained under a constant compression, the diaphragm 55 will be forced down by the stem 37, and the valve 39 will again open to exhaust the air in the bellows 29. It will be readily understood that when once a constant pressure is applied to spring 64 the valve 39 will automatically maintain a substantially constant pressure in the pressure device 8, the amount of the air exhausted therefrom being governed by the pressure in the spring 64, which depends on the amount of depression of sleeve 69, etc. Hence, through the use of the springs 64 and 46 and the diaphragm 55 which is rendered responsive to the pressure in the pressure chamber and cylinder 8 through the agency of the by-pass duct 56, the valve 39 may be either held open by the pressure applied to the stem 67 through the spring 64 or forced closed by the pressure applied to such stem and the diaphragm 55 whereby the pressure in the cylinder 8 is maintained at a selected value within certain limits.

While the vacuum device described hereinbefore may take several different forms, a collapsible bellows-type of mechanism is preferred in this application. The outer casing or housing 28 for encasing the collapsible bellows is preferably secured to the steering post 5 of the vehicle just forward of the dashboard 9 by removable clamps 81 and 82 or the like. The bellows itself comprises a flexible rubber casing or material of that character. The upper end of the bellows 29 is fixedly secured to the head of the casing 28 as shown, and the free end is attached to a movable piston-like head member 84 which is disposed to move back and forth in the cylindrical housing 28.

In order to normally bias the bellows 29 to its extended or open position, a helical spring 85 is inserted inside of the bellows 29 biasing the head member 84 toward its outer position and preventing the flexible bellows 29 from folding inwardly when it collapses. When the air in the bellows is exhausted by the vacuum created in the intake manifold 2 as regulated by the valve mechanism referred to hereinbefore, the piston head 84 of the bellows 29 is actuated inwardly by atmospheric pressure, and the force exerted on the head is equal to the difference in pressure on the inside of the bellows 29 and the atmospheric pressure outside of it, and in order that the vacuum inside the bellows 29 will always be comparable with the vacuum in the intake manifold and making it possible to obtain automatic brake regulation by means of the automatically operable valve 11, an opening 80 is provided in the head 84 which allows a small amount of air to leak into the bellows 29 so that there will always be a slightly less suction on the valves on the bellows side.

In order to utilize the bellows 29 for actuating the brakes of the vehicle, means are provided for connecting the piston head 84 to the brake-operating mechanism. The connecting means may take different forms and shapes, but in order to simplify the installation a pulley 86 is mounted by means of a clamp 87 to the steering post 5 as illustrated in Fig. 1, and a cord 88 is connected to a projection 89 on the piston head 84, passed around the pulley 86, and connected by means of a clevis 90 to the foot-brake lever 91, which is operatively coupled in the usual manner to operate the brakes of an automobile.

The actual brakes are not shown in this application inasmuch as they may be of any standard and well-known construction, and in themselves they constitute no part of the invention. The operating mechanism for the brakes as shown in Figs. 1 to 6 comprises the brake rods 92 which are connected to the foot-brake lever 91 and to the rear wheel brake bands 92a in the usual way, and a front brake rod 93 which is connected to one end of a crank 95 mounted upon a rocker shaft 96. The other end of the crank 95 in turn is connected by means of a rod 97 to a lever 99 to which the front brake-actuating rods 94 are attached, the latter being in turn connected to the front wheel brakes 94a.

The operation of the system so far explained may be briefly described as follows, assuming that the automobile with which the system is employed is moving and that its motor is running.

When it is desired to apply the brakes, brake wheel 72 is tilted by the operator, in the manner shown in Fig. 5, sufficiently to move sleeve 69 and rod 67 down far enough to open valve member 39 of valve 12 a distance corresponding to that necessary to apply the desired braking effort. With the opening of valve member 39 a difference in pressure is established on the two sides of valve member 18 of valve 11 by the suction in the intake manifold, which, assisted by the upward force on the valve of the oil pressure in chamber 15 bearing against piston 24, causes the valve to open. The opening of this valve permits the air in the collapsible cylinder or bellows 29 to be drawn out by the suction created in the intake, and a vacuum to be established therein. As the air is thus withdrawn from bellows 29 the atmospheric pressure acting on it in opposition to the force of spring 85 causes the bellows to collapse upwardly whereby cable 88 which is connected to plate 89 and the braking apparatus is placed under tension and the brakes applied. When the air is exhausted from bellows 29 sufficiently to apply the desired pressure to the brakes as determined by the amount of depression of the brake wheel 72, the diaphragm 55 which forms the lower wall of chamber 52 connected by passages 42 and 56 to bellows 29 is forced upwardly by the atmospheric pressure and overcomes the downward pressure of spring 64, causing valve member 39 to seat and stop the further withdrawal of air from the cylinder.

Due to the presence, however, of vent 80 in the lower wall 89 of bellows 29, air continuously leaks into the bellows and reduces the vacuum therein as well as in chamber 52. This results in the pressure on diaphragm 55 being reduced sufficiently to permit spring 64 to reopen valve 39. Consequently valve 39 opens and closes automatically as the pressure in bellows 29 and chamber 52 changes. With the slowing down of the machine due to the action of the brakes the motor decelerates, and the oil pressure in cylinder 15 of valve 11 falls, which allows spring 21 to gradually close valve 18. Thus the suction from the intake manifold is gradually shut off in accordance with the deceleration of the machine as long as the clutch is not disengaged and the motor is directly connected with the driving wheels. This has the effect of automatically reducing the suction on bellows 29 and permits the leakage of air through vent 30 to gradually reduce the pressure on the brakes in proportion to deceleration of the car, and, as has been described hereinbefore, controls the braking of the car in such a way as to obtain maximum braking at all times.

When it is desired to release the brakes, the operator lets go of brake wheel 72 allowing it to assume its normal inoperative position. With the removal of this downward pressure on valve 39, spring 46 forces it closed and at the same time permits valve 45 to open due to the difference in pressures in chambers 41 and 47, respectively. When valve 45 opens air is permitted to pass into bellows 29, destroying the vacuum therein and permitting spring 85 to extend the cylinder to its normal expanded position whereby the tension in cable 88 is relieved and the brakes released.

In order for the system to operate in the manner described, bellows 29 is constructed in such proportions that the suction obtainable in the motor intake manifold at all times when the vehicle is being operated by the motor will be sufficient to produce the amount of pull necessary on the cable 88 to apply the brakes for maximum braking independently of the speed at which the vehicle is running, and also valve 11 is so constructed that the oil pressure produced in chamber 15 and the suction in chamber 2 will be sufficient at all times and under all conditions to properly operate valve member 18 in the manner described.

In the braking of motor-driven vehicles by means of four-wheel brakes it has been found to advantage to brake the wheels at one end of the vehicle to a greater extent than those at the other and to vary the proportion of the braking effort at the two ends for different speeds and during the deceleration of the vehicle. As illustrated in Fig. 1, provision is made for braking the front wheels to a lesser extent than the rear wheels and for varying the proportion of this braking as the speed varies. Toward such end a compensating device A is provided. This comprises a lever 99 which is pivotally supported in a slotted opening 101 disposed in a frame 102 suitably secured to the vehicle chassis or body in any desired manner. A connecting rod 97 is connected to the free end of such lever 99 and the front wheel brake rod 94 is connected to it at a point spaced downward therefrom. (The distance between the two is predetermined by the braking effort desired in the front brakes as compared to that of the rear brakes.)

To change the tension in the brake rod 94 so as to increase or reduce the applied braking effect on the front wheels without changing the pressure applied to the foot brake lever 91, a sliding or movable fulcrum 103 is provided. This comprises a pair of rollers 104 and 105 mounted in a bifurcated structure 106, the roller 105 being disposed to engage the compensating lever 99 and the roller 104 being adapted to move along a projection 107 forming a part of the base member 102.

In order that this fulcrum may be actuated upwardly to secure the greatest amount of braking tension in the rod 94 when the vehicle is traveling at its highest speed, a cylinder 108 is provided in the bottom of the base member 102 and within which a piston 109 is disposed and connected by a piston rod 111 to the fulcrum member 103. Pressure from the oil pump 27 is introduced in the cylinder through a port disposed at the base of the cylinder and connected to the oil pump 27 by a line 112. Consequently when the motor is running at high speed and the greatest braking effort is required the piston 109 will be forced upwardly by the oil pressure, positioning the fulcrum 103 at its highest position.

For moving the fulcrum downwardly as the motor decreases in speed and the oil pressure falls, a spring 113 is provided inside of the cylinder 108 and adapted to oppose the oil pressure and drive the piston and fulcrum downward in accordance with the decreasing pressure of the oil.

While it is considered preferable to brake the rear wheels of an automobile to a greater extent than the front, the invention contemplates reversing this relation and also shifting the greater braking effort from one end of the machine to the other as it is decelerated or when the brakes are applied at different speeds with the clutch, if there is one engaged. Toward this end the modification shown in Fig. 7 is provided. In this embodiment it will be observed that a compensating unit A' similar to the compensating unit previously described is arranged in the rear wheel brake rod connections and includes a conduit 112' which is connected to the conduit 112 of the oil pump 27. As illustrated, a common brake rod 201 is connected between the brake lever 91 and an equalizer bar 202. The one end of this equalizer bar is connected by a rod 203 with the automatically adjusted lever 99' of the compensating unit which is in turn connected by a rod 204 to the rear wheel brakes. The opposite end of the equalizer bar 202 is connected by a rod 205 to one end of a pivotally supported rocker 206. The opposite end of the latter has the brake rods 94' for the front wheel brakes connected to it.

In the operation of this embodiment of my invention the brakes are applied as desired by the controlled operation of the vacuum device 8 as before described. With the machine traveling fast and the clutch engaged the unit A' is subjected to considerable pressure via the conduit 112' and the fulcrum rollers 104 and 105 are held in an upper position. Hence when the brakes are applied with the fulcrum in an upper position the pull on the rod 203 is, say, ¾ of an inch, and the rod 204 is moved about 1½ inches since it is more than twice as far from the fulcrum. Thus the rear brakes are applied harder than the front brakes since the rods 94' to the front brakes move only about ¾ of an inch. However, as the speed of the vehicle drops and the clutch, if there is one, is left engaged the pressure in the conduit 112' drops and the fulcrum moves downwardly. Now when the rod 203 is moved ¾ of an inch by the vacuum device 8 the rod 204 is moved only slightly more than ¾ of an inch because the distance to the fulcrum is more nearly the same. Thus, as the speed of the vehicle is decreased the braking force on the rear wheels which was greater than that on the front wheels gradually approaches the force on the front wheels until at a predetermined slow speed of the vehicle, with the clutch engaged, the braking forces front and rear are the same.

As shown in Fig. 8, the invention may be applied to a hydraulic braking system. According to this embodiment a pair of master cylinders 301 and 302 are provided for operating the rear and front wheel brake cylinders (not shown), they being connected thereto by the conduits 303 and 304, respectively. Within these cylinders are arranged the operating pistons which are connected to piston rods 305 and 306 projecting from the cylinders and pivotally connected to a common push-bar 307. The outer face of the bar is provided with a flat-bottomed groove within which the end of a brake rod 308 equipped with a roller 309 at its end is engaged, the rod 308 which is rigid being connected to the brake lever 91 and operative for actuating the master cylinder pistons in the conventional manner. To vary the braking effort applied to the brakes at the two ends of the vehicle automatically, the rod 308 is pivotally connected to the brake lever 91 and the piston rod 311 of a compensating unit A² is connected to the outer end of the brake rod. The purpose of this is to vary the position of the point where the roller 309 engages the push-bar 307 with respect to the connecting points of the piston rods 305 and 306 to vary the relative forces exerted in the master cylinders 301 and 302. To carry out its intended purpose the cylinder 312 of the compensating unit in this embodiment is constructed similar to the previously described compensating cylinders except that it has a pivoted support 310 and is similarly provided with a fluid pressure supplied by a flexible connection 112 from the pump 27 or its equivalent. Such an arrangement, it will be obvious, may be readily rearranged or adjusted to place the greater portion of the braking effort at either end of the vehicle and automatically transfer it as desired.

A further modification of the invention is illustrated in Figs. 9 to 12, wherein numeral 401 designates the frame or chassis of an automobile. In the channel sections comprising the side members of this frame there is mounted in suitable bearings 402 a brake shaft 403 in the region of the brake pedal 405'. This shaft is equipped at one end with a keyed arm 405 to which the foot-operated brake lever 405' is suitably connected and the other with a similar arm 406 to which the hand-operated brake lever 406' is connected. Within the machine chassis a pair of levers 407 equipped at their ends with rollers 408 are mounted on this shaft. These rollers are disposed to engage the adjacent faces of the frame of a rectangular yoke 412 which is open at its center to receive the drive shaft 413 of the machine.

At the top and bottom of this yoke there is pivotally connected midway between the ends thereof a pair of pulley frames 414 and 415 equipped with pulleys 416 and 417, respectively. Through these pulleys there is threaded a pair of cables 418 and 419 which have their ends connected respectively to braking mechanism at the front and rear of the vehicle. The cables, as will be apparent, provide for equally applying the brakes at the two front and rear wheels and may be connected to operate either mechanical or hydraulic brakes not shown. To render them responsive to the same directional forces the rear brake cables are extended over a pair of suitably supported idler pulleys 410.

The purpose of mounting the yoke for vertical adjustment is to provide for varying the proportion of braking effort applied to the different ends of the vehicle and for also automatically varying it as the speed of the vehicle varies. To accomplish such end the yoke is supported by a pair of cranks 421 and 422 which are mounted on a shaft 423 supported on bearings 424 on the side members of the chassis as is the shaft 403, the cranks being connected to the inner faces of the yoke by a pair of pivotally attached rigid connecting links 425 and 426. The shaft 423 is in turn held against rotation and rotated by a compensating unit A³. As in the previously described compensating units, this one comprises a suitably supported cylinder 427 which has one end connected by a conduit 428 with the oil system of the motor or to a separate pressure supply operated in proportion to the speed of the vehicle. In it there is arranged a piston 429 which is normally biased to its inactive position by a spring 431 and connected to a piston rod 432 which is in turn connected by a link 433 to a crank 434 keyed to the shaft at right angles to the cranks 421 and 422.

With such an arrangement, the yoke 412 is raised to its upper position by the piston 429, as shown in Fig. 10, when the vehicle is traveling at high speed and is permitted to assume its lower position, as illustrated in Fig. 11, when the speed is reduced, changing of course with the speed. Consequently when the brakes are applied by moving levers 407 and the yoke 412, the braking action is proportioned between the front and back wheels in accordance with the positions of contact of the rollers 408 which are determined by the speed of the machine and is shifted from the front to the back wheels as the vehicle decelerates due to the shifting of the yoke by the piston 429. Obviously, however, this proportion of the braking load can be reversed merely by shifting the cable connections at the top and bottom of the yoke.

It will be understood by those skilled in the art that I have provided a braking system for automobiles or motor-driven vehicles by means of which the brakes may be applied in different proportions at the two ends of the vehicle with different speeds, and by means of which the maximum braking effort can be exerted upon the machine when it is traveling at high speed and automatically reduced as the machine decelerates.

By the term "vacuum" as used herein is not meant a complete absence of air, or of atmospheric pressure, but rather a condition of reduced atmospheric pressure, caused by partial exhausting of the air from the chambers and passages referred to.

Although a preferred embodiment has been illustrated and described in detail as required by the patent statutes, it is believed that many changes in construction and association of parts may be made without departing from the spirit of the invention, and such is contemplated by the appended claims.

I claim:

1. In combination with a motor-driven vehicle having front and rear wheels, brake mechanisms for said wheels, means for applying all said brake mechanisms, and means actuated in accordance with the speed of the motor for automatically varying the percentage of the braking effort on the front wheel brake mechanisms as the motor decelerates.

2. In combination with a motor-driven vehicle having front and rear wheels, brake mechanisms for said wheels, means for applying said brake mechanisms, a pressure pump operated by the motor, and means associated with the front wheel brake mechanisms actuated by the pressure provided by said pump for automatically reducing the percentage of the braking effort applied to the front wheel braking mechanism as the motor decelerates.

3. In combination with a motor-driven vehicle having front and rear wheel brake mechanisms, means for operating the brake mechanisms, an oil pressure pump operated by the motor, and means associated with the front brake mechanisms regulated by the pressure provided by said pump for automatically reducing the percentage of the braking effort effected on the front brake mechanisms as the pressure produced by the pump is reduced.

4. In combination with the front wheel brake mechanisms of a motor-driven vehicle, means including linkage for applying said brake mechanisms, and means acting to change the leverage of the linkage for automatically reducing the applied braking effort in accordance with the deceleration of the motor.

5. In combination with a motor-driven vehicle having braking mechanisms therefor, of means for applying said braking mechanisms, a compensating lever having a variable fulcrum interposed between said braking mechanism and said brake-applying means, and means controlled by the speed of the motor for varying said fulcrum.

6. In a vehicle braking system, means for applying a braking pressure at the front and rear ends of the vehicle, means for regulating said brake pressure-applying means in accordance with the speed of the vehicle engine, and means controlled by the speed of the vehicle engine for automatically varying the proportion of braking pressure applied at the two ends of the vehicle.

7. In a vehicle braking system, means for applying a braking pressure at the front and rear ends of the vehicle, means normally disposed to cause a greater percentage of the braking pressure to be exerted at one end of the vehicle than at the other, and means operative in accordance with the speed of the vehicle engine for varying the proportion of braking pressure at the two ends of the vehicle as the speed of the vehicle engine changes.

8. In a vehicle braking system, a brake-applying member for actuating the vehicle brakes at both ends of the vehicle, fulcrum means for bodily moving said member to apply the brakes, and means operative in accordance with the speed of the vehicle engine for automatically adjusting said member to vary the point of operation of said fulcrum means to vary the braking pressure applied at the two ends of the vehicle.

9. In a vehicle braking system, a brake-applying frame, means connected to the top and bottom of said frame for actuating the brakes at the opposite ends of the vehicle, a pair of supporting members pivotally secured at the sides of said frame, fulcrum means slidably engaging said frame, means for actuating said fulcrum means to actuate said frame and apply or release the brakes, and means operated in accordance with the speed of the vehicle motor for varying the position of said frame with respect to said fulcrum means.

10. In an automobile braking system, dual master cylinders for operating hydraulic brakes on the front and back wheels of the machine, common means for actuating said cylinders, and means responsive to the decrease or increase in speed of the automobile motor for increasing the operation of one of said cylinders and decreasing the operation of the other.

11. In an automobile braking system, a master cylinder for operating hydraulic brakes on the front wheels, a second master cylinder for operating hydraulic brakes on the rear wheels, a common push-bar engaging the piston rods with which said cylinders are equipped, a brake rod disposed to slidably engage said push-bar and operate said piston rods, and means actuated in accordance with the speed of the automobile when operating with the motor and wheels in driving engagement for varying the position of contact of said brake rod on said push-bar.

12. In combination with a motor-driven vehicle, driving wheels, a clutch for operatively connecting the motor and the wheels, front and rear wheel brakes, means for operating said brakes, and means responsive to the speed of the vehicle with the clutch engaged and the motor in high gear for varying the braking forces exerted thereby on both the front and rear wheel brakes.

13. In combination with a motor-driven vehicle having front and rear wheel brakes, means for operating said brakes and means responsive to the speed of the vehicle motor for varying the proportion of the total braking effort received by the front and rear wheel brakes.

14. In a braking system for motor-driven vehicles, the combination of a brake lever, a compensating lever, a rod connecting said brake lever to said compensating lever, a brake rod for applying a brake mechanism connected to the compensating lever at a point spaced from the connecting rod, a base member for the compensating lever slidably supporting one end of the compensating lever, a movable fulcrum member slidably disposed between said compensating lever, and a projection on said base member, said fulcrum being adapted to be moved to different positions to vary tension in the brake rod, a cylinder in said base member, a piston disposed in said cylinder, a piston rod connecting the fulcrum member and the piston together, a resilient member biasing said piston and fulcrum member to a predetermined position, a source of fluid pressure, means for varying said pressure in accordance with the speed of the motor, and a conduit connecting the source of fluid pressure to said cylinder to vary the position of said fulcrum member and automatically vary the tension in the brake rod in proportion to the speed of the motor.

15. In a braking system for a motor-driven vehicle having a clutch, and four wheel brakes, a brake-applying member, means connected to opposite ends of said member for applying the brakes at the two ends of the vehicle, fulcrum means slidably engaging said member for actuating it to apply the brakes, and means operated in accordance with the speed of said vehicle with its clutch and motor engaged for automatically adjusting said member with respect to said fulcrum means.

NATHAN M. LOWER.